US010079537B2

(12) United States Patent
Kuang (10) Patent No.: US 10,079,537 B2
(45) Date of Patent: Sep. 18, 2018

(54) RESONANT CONVERTER WITH POWER FACTOR CORRECTION AND CONTROLLER USED THEREIN (71) Applicant: Hangzhou MPS Semiconductor Technology Ltd., Hangzhou (CN)

(72) Inventor: Naixing Kuang, Hangzhou (CN)

(73) Assignee: Hangzhou MPS Semiconductor Technology Ltd. (CN)

( * ) Notice: Subject to any disclaimer, the term of this patent is extended or adjusted under 35 U.S.C. 154(b) by 0 days.

(21) Appl. No.: 15/846,137

(22) Filed: Dec. 18, 2017

(65) Prior Publication Data

US 2018/0183325 A1 Jun. 28, 2018

(30) Foreign Application Priority Data

Dec. 28, 2016 (CN) .......................... 2016 1 1232982

(51) Int. Cl.
*G05F 1/00* (2006.01)
*H02M 1/42* (2007.01)
*H02M 7/219* (2006.01)
*H02M 3/338* (2006.01)
*H02M 3/337* (2006.01)

(52) U.S. Cl.
CPC ....... *H02M 1/4241* (2013.01); *H02M 1/4225* (2013.01); *H02M 1/4258* (2013.01); *H02M 3/3376* (2013.01); *H02M 3/3385* (2013.01); *H02M 7/219* (2013.01)

(58) Field of Classification Search
CPC ..... G05F 1/40; G05F 1/42; G05F 1/44; G05F 1/462; H02M 3/10; H02M 3/13; H02M 3/125; H02M 3/135
See application file for complete search history.

(56) References Cited

U.S. PATENT DOCUMENTS 8,503,199 B1 * 8/2013 Chapuis .............. H02M 1/4225 363/21.06
2015/0364988 A1 12/2015 Lu et al.

* cited by examiner

*Primary Examiner* — Adolf Berhane
*Assistant Examiner* — Afework Demisse
(74) *Attorney, Agent, or Firm* — Perkins Coie LLP (57) ABSTRACT A resonant converter includes: a rectifier bridge; a first capacitor coupled across output terminals of the rectifier bridge; a diode with its anode coupled to a first terminal of the first capacitor; a second capacitor with a first terminal coupled to the cathode of the diode, and a second terminal coupled to a second terminal of the first capacitor; a first transistor having a first terminal coupled to the first terminal of the second capacitor; a second transistor having a first terminal coupled to a second terminal of the first transistor, and a second terminal coupled to the second terminal of the first capacitor; a resonant tank having a first input terminal coupled to the first terminal of the first capacitor, and a second input terminal coupled to the second terminal of the first transistor and the first terminal of the second transistor; and a rectifying and filtering circuit coupled across output terminals of the resonant tank, and configured to provide an output signal to a load.

16 Claims, 7 Drawing Sheets

RESONANT CONVERTER WITH POWER FACTOR CORRECTION AND CONTROLLER USED THEREIN

CROSS-REFERENCE TO RELATED APPLICATIONS

This application claims the benefit of CN application 201611232982.2, filed on Dec. 28, 2016, and incorporated herein by reference.

TECHNICAL FIELD

The present invention generally relates to electronic circuits, and more particularly but not exclusively, to resonant converters with power factor correction.

BACKGROUND

Resonant tank is employed as a basic converting unit in resonant converters. When resonance occurs, current or voltage of the resonant tank periodically crosses zero. This allows transistors in the resonant converter to turn on or turn off at zero voltage or zero current condition, so as to reduce switching loss of the resonant converter.

Figure 1:
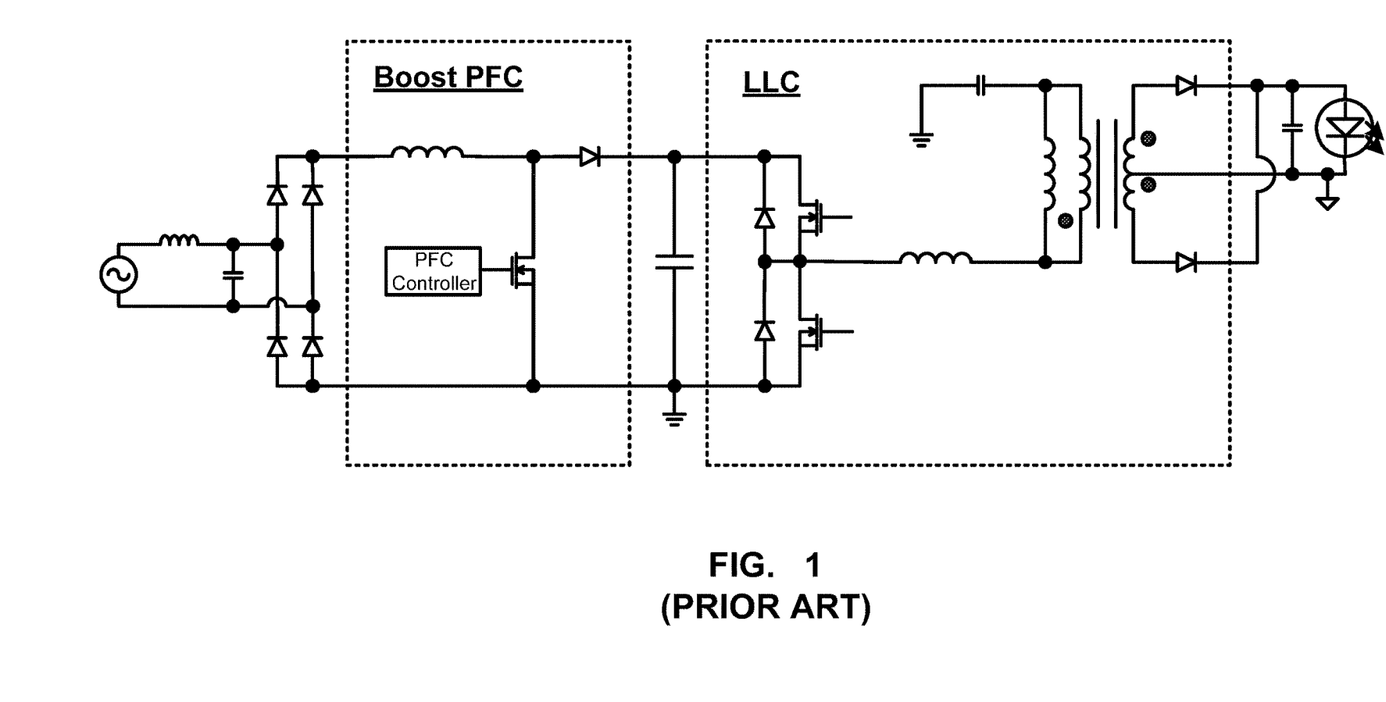
FIG. 1 illustrates a prior art two-stage resonant converter.

To realize high power factor, resonant converters typically adopt two-stage structure as shown in FIG. 1, wherein a dedicated power factor correction (PFC) circuit is utilized. However, the PFC circuit used as the first stage not only increases cost, but also harms power density and efficiency of the resonant converter.

SUMMARY

Embodiments of the present invention are directed to a resonant converter with power factor correction, comprising: a rectifier bridge having a first input terminal, a second input terminal, a first output terminal and a second output terminal, wherein the first and second input terminals are configured to receive an AC input voltage, the second output terminal is coupled to a reference ground; a first capacitor having a first terminal and a second terminal, wherein the first terminal is coupled to the first output terminal of the rectifier bridge, the second terminal is coupled to the reference ground; a diode having an anode and a cathode, wherein the anode is coupled to the first terminal of the first capacitor; a second capacitor having a first terminal and a second terminal, wherein the first terminal is coupled to the cathode of the diode, the second terminal is coupled to the reference ground; a first transistor having a first terminal, a second terminal and a control terminal, wherein the first terminal is coupled to the first terminal of the second capacitor; second transistor having a first terminal and a second terminal and a control terminal, wherein the first terminal is coupled to the second terminal of the first transistor, the second terminal is coupled to the reference ground; a resonant tank having a first input terminal, a second input terminal, a first output terminal and a second output terminal, wherein the first input terminal is coupled to the first terminal of the first capacitor and the anode of the diode, the second input terminal is coupled to the second terminal of the first transistor and the first terminal of the second transistor; and a rectifying and filtering circuit having a first input terminal, a second input terminal, a first output terminal and a second output terminal, wherein the first and second input terminals are respectively coupled to the first and second output terminals of the resonant tank, the first and second output terminals are configured to provide an output signal to a load.

Embodiments of the present invention are also directed to a controller used in the resonant converter, comprising: an error amplifier having a first input terminal, a second input terminal and an output terminal, wherein the first input terminal is configured to receive a reference signal, the second input terminal is configured to receive a feedback signal indicating the output signal of the resonant converter, and wherein based on the reference signal and the feedback signal, the error amplifier generates a compensation signal at the output terminal; and a voltage controlled oscillator having an input terminal and an output terminal, wherein the input terminal is coupled to the output terminal of the error amplifier, and wherein based on the compensation signal, the voltage controlled oscillator generates a control signal at its output terminal to control the first and second transistors.

Embodiments of the present invention are further directed to a control method used in the resonant converter, comprising: generating a feedback signal indicative of the output signal of the resonant converter; generating a compensation signal based on the feedback signal and a reference signal; and generating a control signal based on the compensation signal to control the first and second transistors.

The resonant converter according to embodiments of the present invention has intrinsic power factor correction function due to its specific circuit structure, and thus can achieve high power factor and low THD without dedicated power factor correction circuit.

BRIEF DESCRIPTION OF THE DRAWING

The present invention can be further understood with reference to the following detailed description and the appended drawings, wherein like elements are provided with like reference numerals.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Figure 2:
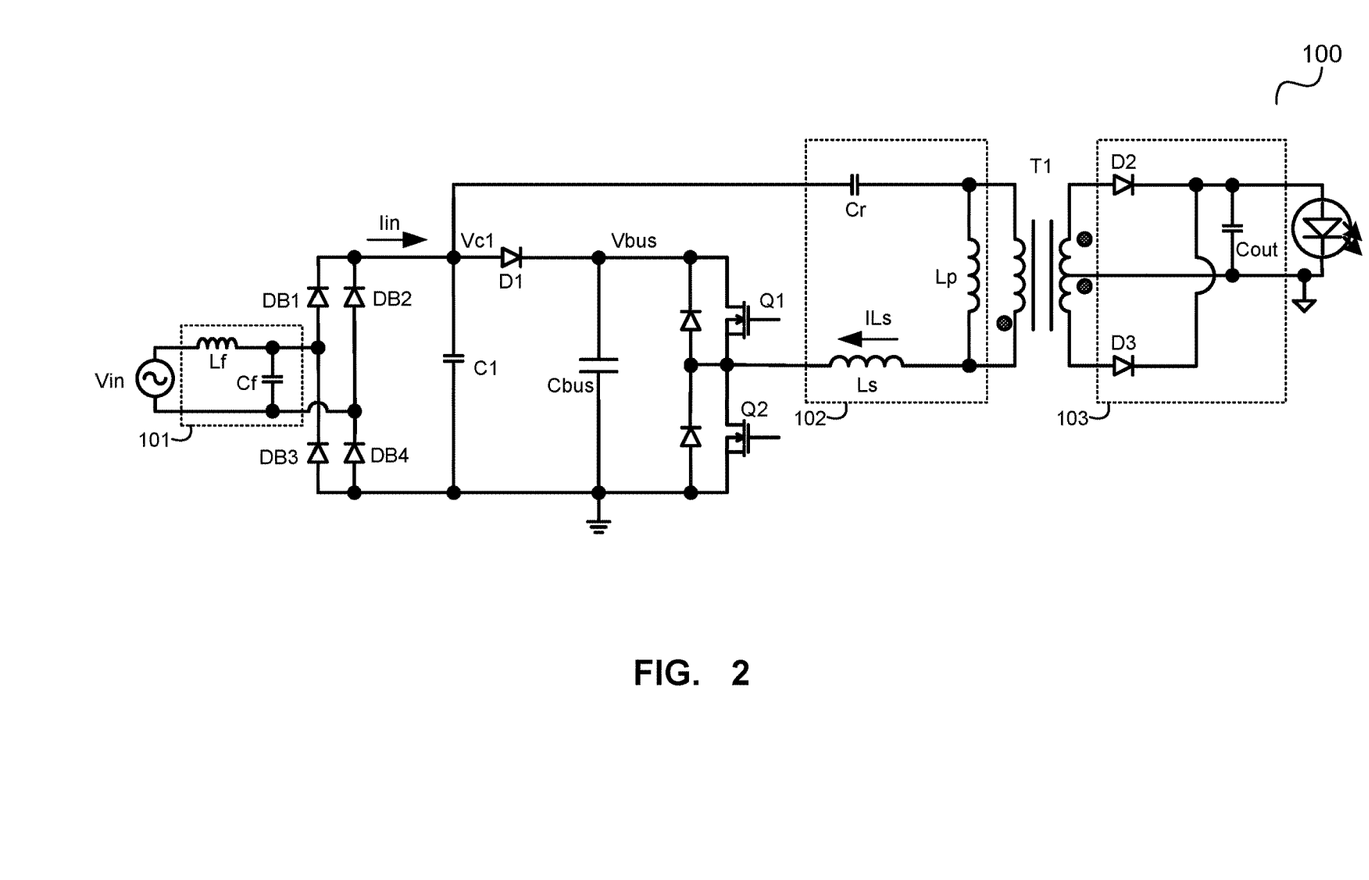
FIG. 2 is a block diagram of a resonant converter 100 in accordance with an embodiment of the present invention.

FIG. 2 is a block diagram of a resonant converter 100 in accordance with an embodiment of the present invention. Compared with the prior art shown in FIG. 1, this resonant converter 100 no longer includes a dedicated PFC circuit. It comprises an EMI (Electro-Magnetic Interference) filter 101, a rectifier bridge, capacitors C1, Cbus, a diode D1, transistors Q1, Q2, a resonant tank 102, a transformer T1, and a rectifying and filtering circuit 103. The resonant converter 100 typically receives an AC input voltage Vin from an AC power source, such as power grid. The EMI filter 101 is coupled between the AC input voltage Vin and the rectifier bridge, and consists mainly of filter inductors and filter capacitors (e.g. inductor Lf and capacitor Cf shown in FIG. 2). The rectifier bridge constituted by diodes DB1~DB4 has a first input terminal, a second input terminal, a first output terminal and a second output terminal, wherein the first and second input terminals are coupled to the EMI filter 101, the second output terminal is coupled to a reference ground. The capacitor C1 has a first terminal and a second terminal, wherein the first terminal is coupled to the first output terminal of the rectifier bridge, the second terminal is coupled to the reference ground. The diode D1 has an anode and a cathode, wherein the anode is coupled to the first terminal of the capacitor C1. The capacitor Cbus has a first terminal and a second terminal, wherein the first terminal is coupled to the cathode of the diode D1, the second terminal is coupled to the reference ground. The transistors Q1 and Q2 both have a first terminal, a second terminal and a control terminal, wherein the first terminal of the transistor Q1 is coupled to the first terminal of the capacitor Cbus. The first terminal of the transistor Q2 is coupled to the second terminal of the transistor Q1, the second terminal is coupled to the reference ground. The transistors Q1 and Q2 could be any controllable semiconductor devices, such as MOSFET.

The resonant tank 102 has a first input terminal, a second input terminal, a first output terminal and a second output terminal, wherein the first input terminal is coupled to the first terminal of the capacitor C1 and the anode of the diode D1, the second input terminal is coupled to the second terminal of the transistor Q1 and the first terminal of the transistor Q2. In the embodiment of FIG. 2, the resonant tank 102 includes an LLC serial resonant circuit consisting of a resonant capacitor Cr and resonant inductors Lp, Ls, wherein the resonant inductor Lp might be realized by magnetizing inductance of the transformer T1. People of ordinary skills in the art could realize, however, that this is not used to limit the present invention, and the resonant tank 102 could be configured in other suitable structures, such as parallel resonant circuit or serial-parallel resonant circuit.

The transformer T1 has a primary winding and a secondary winding, wherein the primary winding is coupled between the first and second output terminals of the resonant tank 102. The rectifying and filtering circuit 103 has a first input terminal, a second input terminal, a first output terminal and a second output terminal, wherein the first and second input terminals are coupled to the secondary winding of the transformer T1, the first and second output terminals are configured to provide an output signal to a load (e.g. LED). In the embodiment show in FIG. 2, the rectifying and filtering circuit 103 includes an output capacitor Cout and a full-wave rectifying circuit consisting of diodes D2 and D3. Obviously, the full wave rectifying provided therein could also replaced by a full-bridge or half-wave rectifying circuit.

Figure 3:
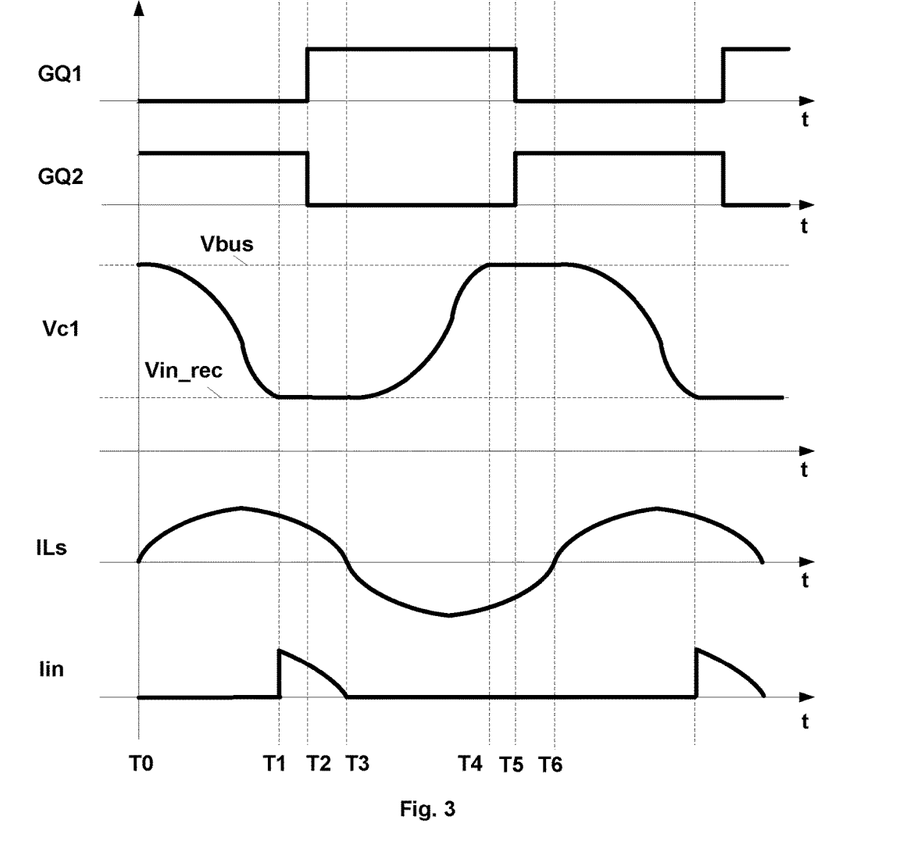
FIG. 3 illustrates working waveforms of the resonant converter 100 shown in FIG. 1 in accordance with an embodiment of the present invention.

Hereinafter, working principle of the resonant converter 100 will be detailed described with reference to FIG. 3. FIG. 3 illustrates working waveforms of the resonant converter 100, wherein GQ1 and GQ2 are driving signals respectively received at the control terminals of transistor Q1 and Q2, Vc1 and Vbus respectively indicate the voltage across the capacitors C1 and Cbus. ILs is the current flowing through the resonant inductor Ls, and Iin represents the output current of the rectifier bridge. Vin_rec indicates the rectified value of the AC input voltage Vin. Typically, the transistors Q1 and Q2 are turned on complementarily with a 50% duty cycle. The resonant capacitor Cr and the resonant inductors Lp, Ls are in resonance during operation, thus the current ILs flowing through the resonant inductor Ls is substantially sinusoidal. Furthermore, since the capacitance of the capacitor Cbus is generally designed to be relatively large, the voltage Vbus across it could be deemed as constant and unvaried. Specifically in the analysis below, the voltage drop across all the diodes are ignored for simplicity.

Referring to FIG. 3, during T0~T1, the transistor Q1 turns off and the transistor Q2 turns on. The current ILs is positive, and discharges the capacitor C1 through the capacitor Cr, the inductors Lp, Ls, and the transistor Q2. The voltage Vc1 gradually decreases until reaches the rectified value Vin_rec at T1.

In the flowing time period T1~T3, depending on whether the AC input voltage Vin is positive or negative, the corresponding diodes in the rectifier bridge turn on, so the voltage Vc1 is kept equal to the rectified value Vin_rec. To be more specific, the diodes DB1 and DB4 will turn on if the AC input voltage Vin is at its positive half-cycle. Otherwise if the AC input voltage Vin is at its negative half-cycle, the diodes DB2 and DB3 will turn on instead. During T1~T3, the discharge of the capacitor C1 is ceased. The current ILS is equal to the current Iin and is directly provide by the AC power source through the rectifier bridge. Specifically at the time point T2, the transistor Q1 changes from off into on and transistor Q2 changes from on into off under the control of the driving signals GQ1 and GQ2. Since the current ILS is still positive, it will freewheel through the body diode of the transistor Q1 until direction change at T3.

During T3~T4, the current ILs charges the capacitor C1 through the transistor Q1, the inductors Ls, Lp, and the capacitor Cr. All the diodes in the rectifier bridge are off. The voltage Vc1 keeps increasing and becomes equal to the voltage Vbus at T4.

In the subsequent time period T4~T6, the diode D1 turns on to clamp the voltage Vc1 to be equal to Vbus. Specifically at time point T5, the transistor Q1 changes from on into off and transistor Q2 changes from off into on. The current ILs flows through the transistor Q2, the inductors Ls, Lp, the capacitor Cr, the diode D1 and the capacitor Cbus, until it changes direction at T6.

The time periods T0~T6 constitute a switching period of the resonant converter 100, and the operation conducted therein is repeated to continuously provide energy from the AC power source to the load.

Generally, the AC input voltage Vin is a power frequency AC signal which could be expressed as:

$$Vin = Vpk * \sin\theta \quad (1)$$

In accordance with FIG. 3, the current ILs is sinusoidal, thus the voltage Vc1 during T0~T1 could be expressed as:

$$Vc1(t) = \frac{Vbus}{2} * (1 + \cos\omega t) \quad (2)$$

Specifically at time point T1, we have:

$$Vc1(T1) = \frac{Vbus}{2} * [1 + \cos(\omega * T1)] = \text{Vin\_rec} = Vpk * |\sin\theta| \quad (3)$$

Provided that the switching frequency of the transistors Q1 and Q2 is constant in one power frequency period, the output current provided to the load could be:

$$Io = \frac{1}{T3} * \int_0^{T3} n * ILs(t) dt \quad (4)$$

Wherein n is the turn ratio of the transformer T1. And the average value of the current Iin could be expressed as:

$$\text{Iin\_av} = \frac{1}{2*T3} * \int_{T1}^{T3} ILs(t) dt \quad (5)$$

In accordance the equations (1)~(5) provided above, it could be concluded that:

$$\text{Iin\_av} = \frac{1}{2} * \frac{Io}{n} * \frac{Vpk}{Vbus} * |\sin\theta| \quad (6)$$

Owing to the EMI filter 101, the rectified value of the AC input current provided by the AC power source is equal to the average value Iin_av of the input current Iin. And through comparison between the equations (3) and (6), it is obvious that the average value Iin_av is proportional to and in phase with the rectified value Vin_rec of the AC input voltage Vin. Therefore, we can reach a conclusion that the AC input current is also proportional to and in phase with the AC input voltage Vin. In other words, through cooperation of the rectifier bridge, the diode D1 and the capacitor C1, the resonant converter 100 realizes a high power factor and low THD.

Figure 4:
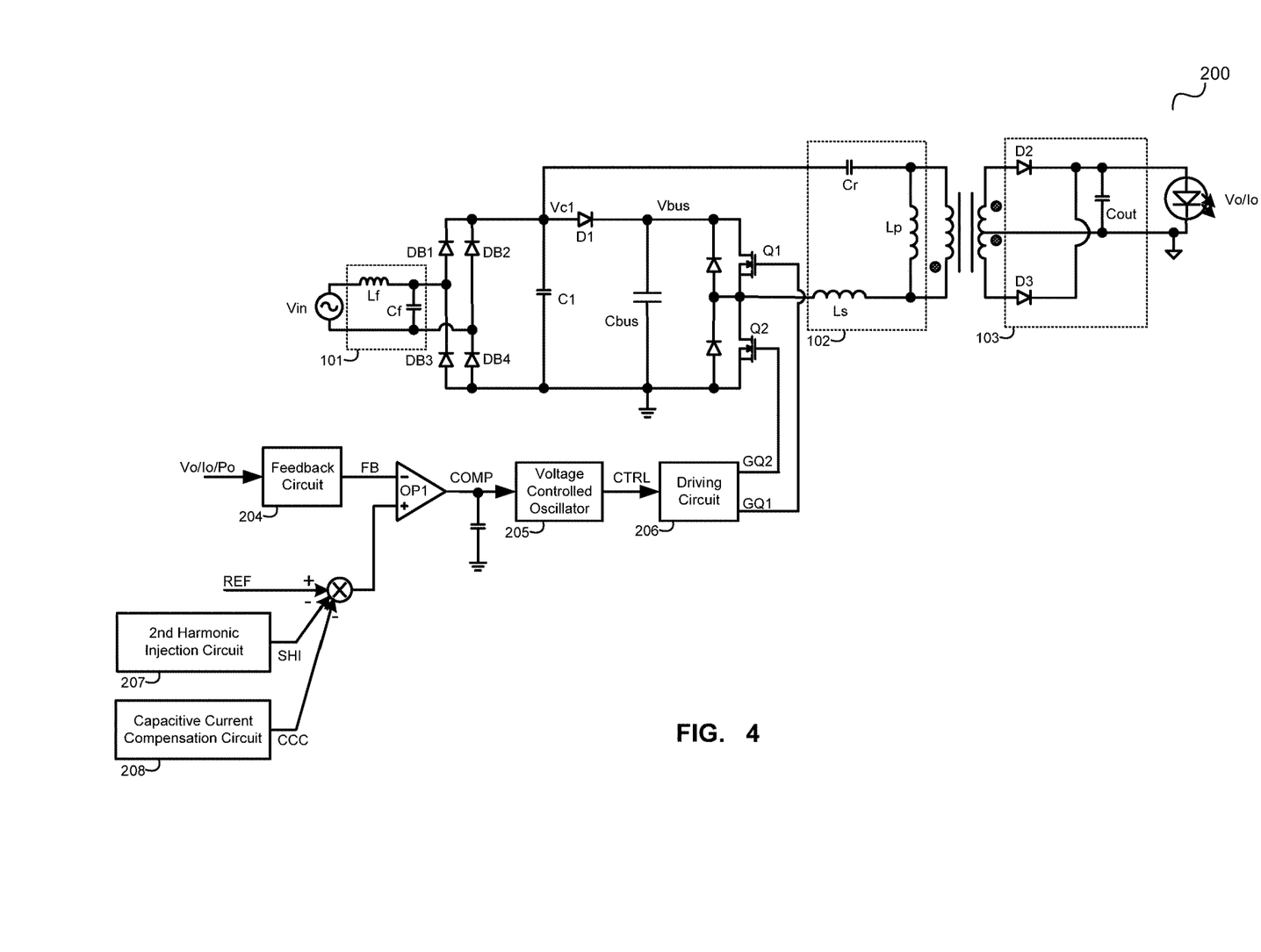
FIG. 4 schematically illustrates a resonant converter 200 in accordance with an embodiment of the present invention.

FIG. 4 schematically illustrates a resonant converter 200 in accordance with an embodiment of the present invention, wherein a detailed control circuit for controlling the transistors Q1 and Q2 are provided as an example. The control circuit generally includes a feedback circuit 204, an error amplifier OP1, a voltage controlled oscillator 205 and a driving circuit 206. The feedback circuit 204 is configured to generate a feedback signal FB based on the output signal of the resonant converter. The output signal could be an output voltage Vo, an output current Io or an output power Po. The error amplifier OP1 has a non-inverting input terminal, an inverting input terminal and an output terminal, wherein the non-inverting input terminal is configured to receive a reference signal REF, the inverting input terminal is coupled to the feedback circuit 204 to receive the feedback signal FB. Based on the reference signal REF and the feedback signal FB, the error amplifier OP1 generates a compensation signal COMP at its output terminal. Generally speaking, there is a compensation circuit, which consists of resistors and/or capacitors, coupled between the output terminal of the error amplifier OP1 and the reference ground.

The voltage controlled oscillator 205 has an input terminal and an output terminal, wherein the input terminal is coupled to the output terminal of the error amplifier OP1, and wherein based on the compensation signal OP1, the voltage controlled oscillator 205 generates a control signal CTRL at its output terminal. The control signal CTRL is typically a pulse signal which has a 50% duty cycle and has its frequency adjusted by the compensation signal COMP. The driving circuit 206 has an input terminal, a first output terminal and a second output terminal, wherein the input terminal is coupled to the output terminal of the voltage controlled oscillator 205, the first and second output terminals are respectively coupled to the control terminals of the transistors Q1 and Q2. Based on the control signal CTRL, the driving circuit 206 provides the driving signals GQ1 and GQ2 respectively at its first and second output terminals.

The resonant converter 200 shown in FIG. 4 adjusts its switching frequency in accordance with the relationship ship between the feedback signal FB and the reference signal REF, so as to regulate the output signal provided to the load.

As discussed above, the resonant converter 200 could realize high power factor though charge, discharge and voltage clamp of the capacitor C1, in condition that the switching frequency of the resonant converter is basically constant in one power frequency period. But since the AC input voltage Vin is a sinusoidal signal, the switching frequency of the resonant converter determined by the output of the error amplifier OP1 also varies along with the AC input voltage Vin. The higher the absolute value of the AC input voltage Vin, the lower the switching frequency, and vice versa. To solve this problem, a second harmonic injection circuit 207 is incorporated according to embodiments of the present invention. Based on the AC input voltage Vin, the second harmonic injection circuit 207 generates a second harmonic injection signal SHI, which is subsequently subtracted from the reference signal REF. This second harmonic injection signal SHI is related to the second harmonic of the AC input voltage Vin, and could be gained through rectification, division and AC component extraction of the AC input voltage Vin.

Besides the issue mentioned above, power factor of the resonant converter 200 might also be harmed by the EMI filter 101. Although the EMI filter 101 may have a variety of circuit structure, the filter inductor Lf and filter capacitor Cf as shown in FIG. 4 are always necessary. The existence of the filter capacitor Cf will cause large phase difference between the AC input voltage and AC input current, which consequently limits the power factor. The higher the capacitance of the filter capacitor Cf, the lower the power factor. And this adverse impact becomes even worse in light load condition. To conquer this problem, a capacitive current compensation circuit 208 could be further employed. This capacitive current compensation circuit 208 generates a capacitive current compensation signal CCC based on a current let flowing through the filter capacitor Cf. The capacitive current compensation signal CCC is then subtracted from the reference signal REF.

Although the second harmonic injection signal SHI and capacitive current compensation signal CCC are both subtracted from the reference signal REF in the embodiment of FIG. 4, people of ordinary skills in the art could realize that this is only provided as an example. Alternative solutions, such as adding the second harmonic injection signal SHI and/or capacitive current compensation signal CCC to the feedback signal FB, or changing polarity or combination of the signals, are also applicable here. And none of these modifications departs from the spirit and the scope of the invention.

Figure 5:
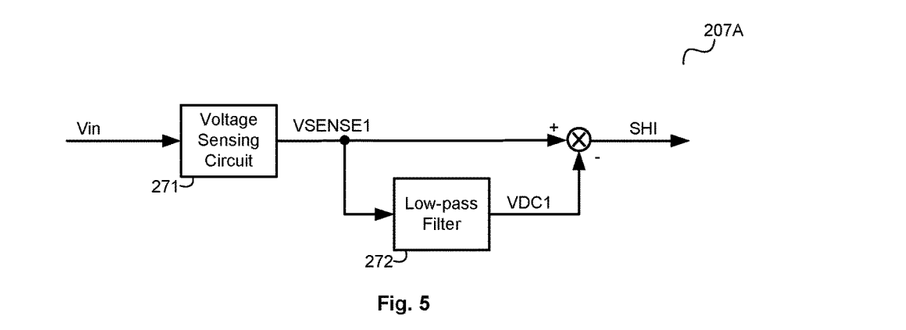
FIG. 5 schematically illustrates a second harmonic injection circuit 207 A in accordance with an embodiment of the present invention.

FIG. 5 schematically illustrates a second harmonic injection circuit 207A in accordance with an embodiment of the present invention. It includes a voltage sensing circuit 271 and a low-pass filter 272. The voltage sensing circuit 271 is configured to generate a voltage sensing signal VSENSE1 based on the AC input voltage Vin, for example, through rectifying and diving the AC input voltage Vin. The low-pass filter 272 is coupled to the voltage sensing circuit 271 and is configured to filter the voltage sensing signal VSENSE1 to generate a DC signal VDC1. Afterwards, the difference between the voltage sensing signal VSENSE1 and the DC signal VDC1 is utilized as the second harmonic injection signal SHI and provided to the error amplifier OP1.

Figure 6:
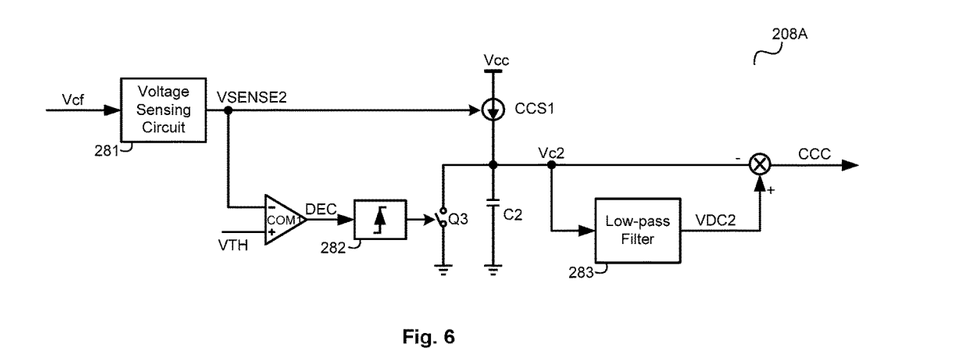
FIG. 6 schematically illustrates a capacitive current compensation circuit 208A in accordance with an embodiment of the present invention.

FIG. 6 schematically illustrates a capacitive current compensation circuit 208A in accordance with an embodiment of the present invention. It contains a voltage sensing circuit 281, a controllable current source CCS1, a capacitor C2, a comparator COM1, a one-shot circuit 282, a transistor Q3 and a low-pass filter 283. The voltage sensing circuit 281 is configured to generate a voltage sensing signal VSENSE2 based on the voltage Vcf across the filter capacitor Cf, for instance, through rectifying and dividing the voltage Vcf. The controllable current source CCS1 has a first terminal, a second terminal and a control terminal, wherein the first terminal is coupled to a power supply voltage Vcc, and the control terminal is coupled to the voltage sensing circuit 281 to receive the voltage sensing signal VSENSE2. The capacitor C2 has a first terminal and a second terminal, wherein the first terminal is coupled to the second terminal of the controllable current source CCS1, the second terminal is coupled to the reference ground.

The comparator COM1 has a non-inverting input terminal, an inverting input terminal and an output terminal, wherein the non-inverting input terminal is configured to receive a threshold voltage VTH, the inverting input terminal is coupled to the voltage sensing circuit 281 to receive the voltage sensing signal VSENSE2, and the output terminal is configured to provide a comparison signal DEC. The one-shot circuit 282 has an input terminal and an output terminal, wherein the input terminal is coupled to the output terminal of the comparator COM1 to receive the comparison signal DEC. The transistor Q3 has a first terminal, a second terminal and a control terminal, wherein the first terminal is coupled to the first terminal of the capacitor C2, the second terminal is coupled to the reference ground, and the control terminal is coupled to the output terminal of the one-shot circuit 282. The low-pass filter 283 is coupled to the first terminal of the capacitor C2 and configured to filter the voltage Vc2 across the capacitor C2 to generate a DC signal VDC2. Afterwards, the difference between the DC signal VDC2 and the voltage Vc2 is provided to the error amplifier OP1 as the capacitive current compensation signal CCC.

Figure 7:
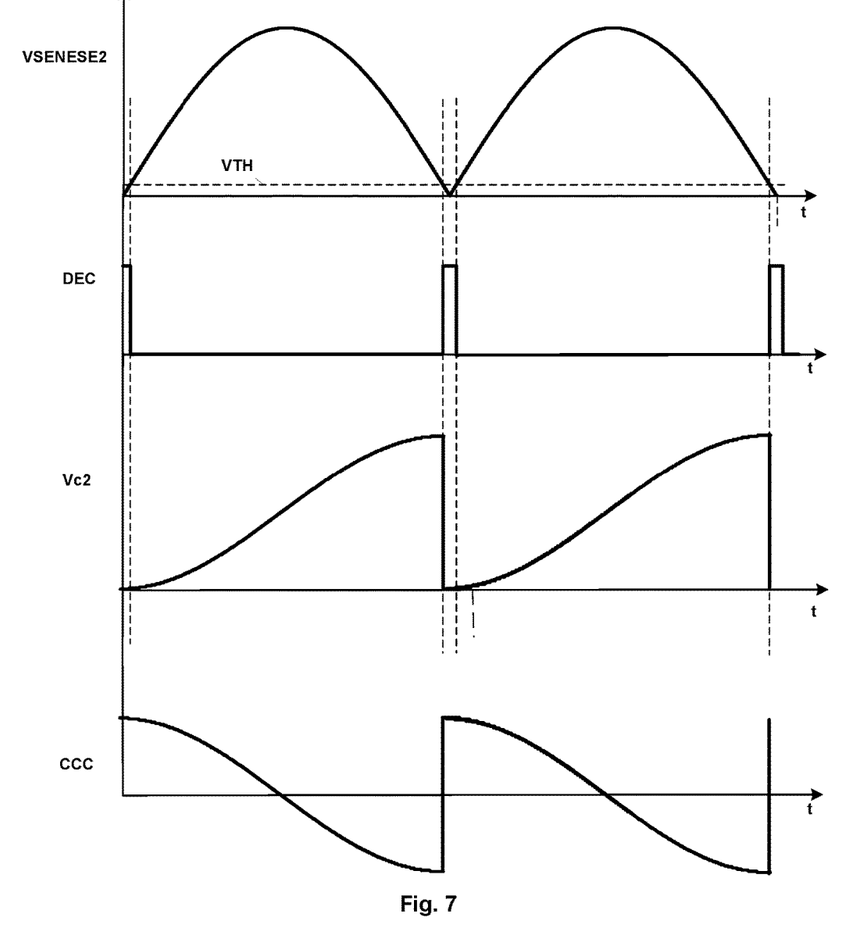
FIG. 7 illustrates working waveforms of the capacitive current compensation circuit 208A shown in FIG. 6 in accordance with an embodiment of the present invention.

FIG. 7 illustrates working waveforms of the capacitive current compensation circuit 208A shown in FIG. 6 in accordance with an embodiment of the present invention. As can be seen from the figure, once the voltage sensing signal VSENSE2 decreases to reach the threshold voltage VTH, the comparison signal DEC changes from logical low into logic high, which triggers the on-shot circuit 281 to turn on the transistor Q3 for a short time period. During this time period, the voltage Vc2 across the capacitor C2 is discharged to zero. After that, the controllable current source CCS1 charges the capacitor C2 under the control of the voltage sensing signal VSENSE2, which is similar to integration of the voltage sensing signal VSENSE2. As illustrated in FIG. 7, the capacitive current compensation signal CCC well simulates the rectified value of the current Id flowing through the filter capacitor Cf. Therefore, subtracting this capacitive current compensation signal CCC from the reference signal REF could effectively reduce the adverse effect caused by the filter capacitor Cf.

Figure 8:
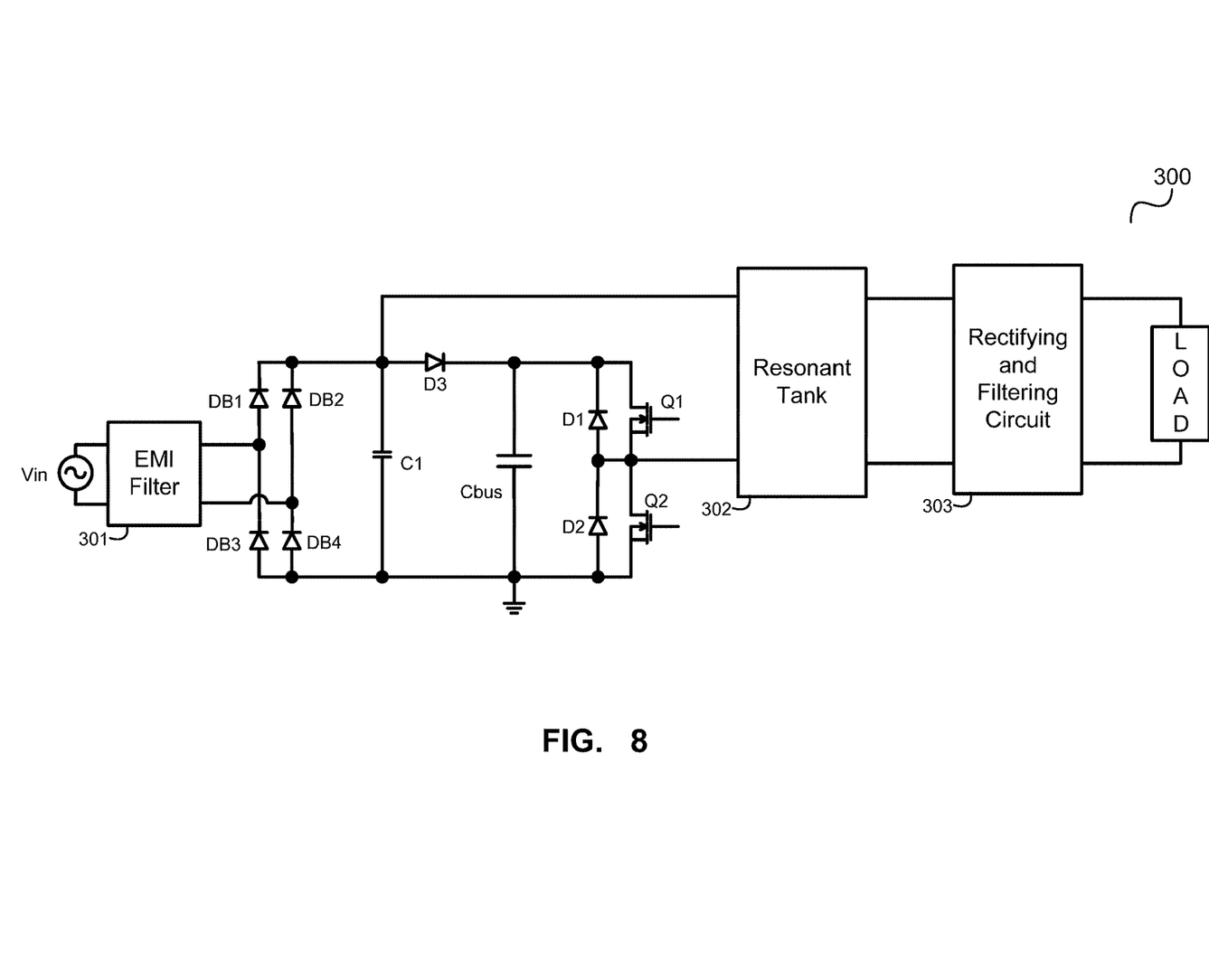
FIG. 8 is a block diagram of a resonant converter 300 in accordance with an embodiment of the present invention.

Although embodiments provided above are all related to isolated resonant converters for driving LEDs, it should be noted that this is not used to limit the invention. In other applications, such as shown in FIG. 8, isolation is not necessary and the transformer could be omitted. Furthermore, the EMI filter 301, resonant tank 302, and rectifying and filtering circuit 303 in the resonant converter 300 of FIG. 8 could be configured in accordance with practical requirements, and not limited by the specific structure contained in the foregoing described embodiments.

Obviously many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

What is claimed is:

1. A resonant converter with power factor correction, comprising:
    a rectifier bridge having a first input terminal, a second input terminal, a first output terminal and a second output terminal, wherein the first and second input terminals are configured to receive an AC input voltage, the second output terminal is coupled to a reference ground;
    a first capacitor having a first terminal and a second terminal, wherein the first terminal is coupled to the first output terminal of the rectifier bridge, the second terminal is coupled to the reference ground;
    a diode having an anode and a cathode, wherein the anode is coupled to the first terminal of the first capacitor;
    a second capacitor having a first terminal and a second terminal, wherein the first terminal is coupled to the cathode of the diode, the second terminal is coupled to the reference ground;
    a first transistor having a first terminal, a second terminal and a control terminal, wherein the first terminal is coupled to the first terminal of the second capacitor;
    a second transistor having a first terminal and a second terminal and a control terminal, wherein the first terminal is coupled to the second terminal of the first transistor, the second terminal is coupled to the reference ground;
    a resonant tank having a first input terminal, a second input terminal, a first output terminal and a second output terminal, wherein the first input terminal is coupled to the first terminal of the first capacitor and the anode of the diode, the second input terminal is coupled to the second terminal of the first transistor and the first terminal of the second transistor; and a rectifying and filtering circuit having a first input terminal, a second input terminal, a first output terminal and a second output terminal, wherein the first and second input terminals are respectively coupled to the first and second output terminals of the resonant tank, the first and second output terminals are configured to provide an output signal to a load.

2. The resonant converter of claim 1, further comprising a transformer with a primary winding and a secondary winding, wherein the primary winding is coupled between the first and second output terminals of the resonant tank, the secondary winding is coupled between the first and second input terminals of the rectifying and filtering circuit.

3. The resonant converter of claim 1, further comprising:
a feedback circuit configured to generate a feedback signal based on the output signal of the resonant converter;
an error amplifier having a first input terminal, a second input terminal and an output terminal, wherein the first input terminal is configured to receive a reference signal, the second input terminal is coupled to the feedback circuit, and wherein based on the reference signal and the feedback signal, the error amplifier generates a compensation signal at the output terminal;
a compensation circuit coupled between the output terminal of the error amplifier and the reference ground;
a voltage controlled oscillator having an input terminal and an output terminal, wherein the input terminal is coupled to the output terminal of the error amplifier, and wherein based on the compensation signal, the voltage controlled oscillator generates a control signal at its output terminal; and
a driving circuit having an input terminal, a first output terminal and a second output terminal, wherein the input terminal is coupled to the output terminal of the voltage controlled oscillator, the first and second output terminals are respectively coupled to the control terminals of the first and second transistors, and wherein based on the control signal, the driving circuit provides a first driving signal and a second driving signal respectively at its first and second output terminals.

4. The resonant converter of claim 3, further comprising a second harmonic injection circuit configured to generate a second harmonic injection signal based on the AC input voltage, and configured to provide the second harmonic injection signal to the first or second input terminal of the error amplifier.

5. The resonant converter of claim 4, wherein the second harmonic injection circuit includes:
a first voltage sensing circuit configured to generate a first voltage sensing signal based on the AC input voltage; and
a first low-pass filter coupled to the first voltage sensing circuit and configured to filter the first voltage sensing signal to generate a first DC signal; wherein
the difference between the first voltage sensing signal and the first DC signal is utilized as the second harmonic injection signal and subtracted from the reference signal.

6. The resonant converter of claim 3, further comprising:
an EMI filter coupled between the AC input voltage and the rectifier bridge, wherein the EMI filter includes a filter inductor and a filter capacitor; and a capacitive current compensation circuit configured to generate a capacitive current compensation signal based on a current flowing through the filter capacitor, and configured to provide the capacitive current compensation signal to the first or second input terminal of the error amplifier.

7. The resonant converter of claim 6, wherein the capacitive current compensation circuit includes:
a second voltage sensing circuit configured to generate a second voltage sensing signal based on the voltage across the filter capacitor; and
a controllable current source having a first terminal, a second terminal and a control terminal, wherein the first terminal is coupled to a power supply voltage, and the control terminal is coupled to the second voltage sensing circuit to receive the second voltage sensing signal;
a third capacitor having a first terminal and a second terminal, wherein the first terminal is coupled to the second terminal of the controllable current source, the second terminal is coupled to the reference ground;
a comparator having a first input terminal, a second input terminal and an output terminal, wherein the first input terminal is coupled to a threshold voltage, the second input terminal is coupled to the second voltage sensing circuit to receive the second voltage sensing signal, and the output terminal is configured to provide a comparison signal;
a one-shot circuit having an input terminal and an output terminal, wherein the input terminal is coupled to the output terminal of the comparator;
a third transistor having a first terminal, a second terminal and a control terminal, wherein the first terminal is coupled to the first terminal of the third capacitor, the second terminal is coupled to the reference ground, and the control terminal is coupled to the output terminal of the one-shot circuit; and
a second low-pass filter coupled to the first terminal of the third capacitor and configured to filter the voltage across the third capacitor to generate a second DC signal; wherein
the difference between the second DC signal and the voltage across the third capacitor is utilized as the capacitive current compensation signal and subtracted from the reference signal.

8. A controller used in the resonant converter of claim 1, comprising:
an error amplifier having a first input terminal, a second input terminal and an output terminal, wherein the first input terminal is configured to receive a reference signal, the second input terminal is configured to receive a feedback signal indicating the output signal of the resonant converter, and wherein based on the reference signal and the feedback signal, the error amplifier generates a compensation signal at the output terminal; and
a voltage controlled oscillator having an input terminal and an output terminal, wherein the input terminal is coupled to the output terminal of the error amplifier, and wherein based on the compensation signal, the voltage controlled oscillator generates a control signal at its output terminal to control the first and second transistors.

9. The controller of claim 8, further comprising a second harmonic injection circuit configured to generate a second harmonic injection signal based on the AC input voltage, and configured to provide the second harmonic injection signal to the first or second input terminal of the error amplifier to reduce switching frequency variation of the resonant converter caused by the AC input voltage.

10. The controller of claim 9, wherein the second harmonic injection circuit includes:
   a first voltage sensing circuit configured to generate a first voltage sensing signal based on the AC input voltage; and
   a first low-pass filter coupled to the first voltage sensing circuit and configured to filter the first voltage sensing signal to generate a first DC signal; wherein
   the difference between the first voltage sensing signal and the first DC signal is utilized as the second harmonic injection signal and subtracted from the reference signal.

11. The controller of claim 8, wherein the resonant converter further comprises an EMI filter having a filter inductor and a filter capacitor, and coupled between the AC input voltage and the rectifier bridge, and wherein the controller further includes a capacitive current compensation circuit configured to generate a capacitive current compensation signal based on a current flowing through the filter capacitor, and configured to provide the capacitive current compensation signal to the first or second input terminal of the error amplifier to improve power factor of the resonant converter.

12. The controller of claim 11, wherein the capacitive current compensation circuit includes:
   a second voltage sensing circuit configured to generate a second voltage sensing signal based on the voltage across the filter capacitor; and
   a controllable current source having a first terminal, a second terminal and a control terminal, wherein the first terminal is coupled to a power supply voltage, and the control terminal is coupled to the second voltage sensing circuit to receive the second voltage sensing signal;
   a third capacitor having a first terminal and a second terminal, wherein the first terminal is coupled to the second terminal of the controllable current source, the second terminal is coupled to the reference ground;
   a comparator having a first input terminal, a second input terminal and an output terminal, wherein the first input terminal is coupled to a threshold voltage, the second input terminal is coupled to the second voltage sensing circuit to receive the second voltage sensing signal, and the output terminal is configured to provide a comparison signal;
   a one-shot circuit having an input terminal and an output terminal, wherein the input terminal is coupled to the output terminal of the comparator;
   a third transistor having a first terminal, a second terminal and a control terminal, wherein the first terminal is coupled to the first terminal of the third capacitor, the second terminal is coupled to the reference ground, and the control terminal is coupled to the output terminal of the one-shot circuit; and
   a second low-pass filter coupled to the first terminal of the third capacitor and configured to filter the voltage across the third capacitor to generate a second DC signal; wherein
   the difference between the second DC signal and the voltage across the third capacitor is utilized as the capacitive current compensation signal and subtracted from the reference signal.

13. A control method used in the resonant converter of claim 1, comprising:
   generating a feedback signal indicative of the output signal of the resonant converter;
   generating a compensation signal based on the feedback signal and a reference signal; and
   generating a control signal based on the compensation signal to control the first and second transistors.

14. The control method of claim 13, further comprising:
   generating a second harmonic injection signal based on the AC input voltage; wherein
   the compensation signal is generated based on the feedback signal, the reference signal and the second harmonic injection signal.

15. The control method of claim 14, wherein the step of generating the second harmonic injection signal comprises:
   rectifying and dividing the AC input voltage to generate a first voltage sensing signal;
   filtering the first sensing signal to generate a first DC signal; and
   generating the second harmonic injection signal based on the difference between the first voltage sensing signal and the first DC signal.

16. The control method of claim 13, wherein the resonant converter further comprises an EMI filter having a filter inductor and a filter capacitor, and coupled between the AC input voltage and the rectifier bridge, the control method further comprises:
   generating a capacitive current compensation signal based on a current flowing through the filter capacitor; wherein
   the compensation signal is generated based on the feedback signal, the reference signal and the capacitive current compensation signal.

* * * * *